United States Patent
Kabuki

Patent Number: 5,971,568
Date of Patent: Oct. 26, 1999

[54] OPTICAL DEVICE AND MULTISURFACE REFLECTOR

[75] Inventor: Kiyoyuki Kabuki, Himeji, Japan

[73] Assignee: Ushiodenki Kabushiki Kaisha, Tokyo, Japan

[21] Appl. No.: 08/775,094

[22] Filed: Dec. 30, 1996

[30] Foreign Application Priority Data

Dec. 28, 1995 [JP] Japan ................. 7-342093

[51] Int. Cl.$^6$ ................................. F21V 7/06
[52] U.S. Cl. ................. 362/297; 362/343; 362/346; 362/348; 362/309; 362/332
[58] Field of Search ................. 362/268, 305, 362/346, 348, 304, 297, 308, 309, 331, 332, 328, 343, 518, 522; 359/628

[56] References Cited

U.S. PATENT DOCUMENTS

| | | |
|---|---|---|
| 2,186,123 | 1/1940 | Räntsch et al. |
| 4,234,247 | 11/1980 | Dorman. |
| 4,916,585 | 4/1990 | Nino. |
| 4,972,307 | 11/1990 | Takatsuji et al. ............... 362/309 |
| 5,707,141 | 1/1998 | Yamamota et al. ............. 362/309 |
| 5,727,874 | 3/1998 | Yamamoto et al. ............. 362/309 |

FOREIGN PATENT DOCUMENTS

| | | |
|---|---|---|
| 0 0563 874 | 10/1993 | European Pat. Off. |
| 2 040 431 | 8/1980 | United Kingdom. |
| WO 94/15143 | 7/1994 | WIPO. |

Primary Examiner—Thomas M. Sember
Attorney, Agent, or Firm—Sixbey Friedman, Leedom & Ferguson; David S. Safran

[57] ABSTRACT

An optical device and a multisurface reflector which can be used for this purpose, which has high uniformity of the illumination intensity on the entire surface of an area to be illuminated, and a small shape, and in which a high utilization factor of the light can be obtained is achieved according to the invention by there being a multisurface concave reflector which is composed of numerous mirror elements which combine to form a concave reflection surface of a generally oval shape. A light source lamp is arranged such that an emission part of it is positioned along the center axis of the multisurface reflector, and a lens plate is located in front of the multisurface reflector on a plane perpendicular to its center axis. The lens plate a plurality of lens elements which each correspond number to the number of mirror elements on the reflector. Furthermore, according to the invention, each mirror element of the multisurface reflector has a first focal point positioned in the emission part of the light source lamp, and another focal point is positioned in a corresponding lens element of the lens plate. The light from the emission part of the light source lamp is divided by each mirror element, and this divided light is superimposed by the respective lens element in an area to be illuminated.

7 Claims, 5 Drawing Sheets

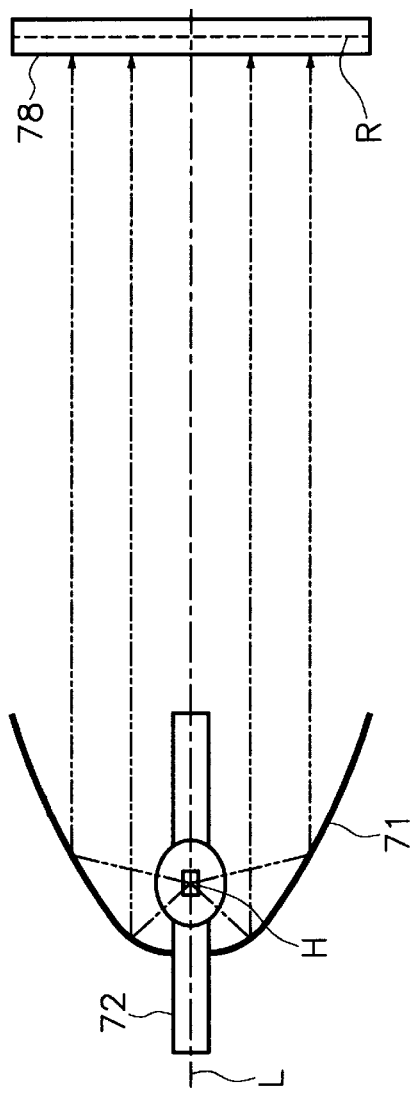
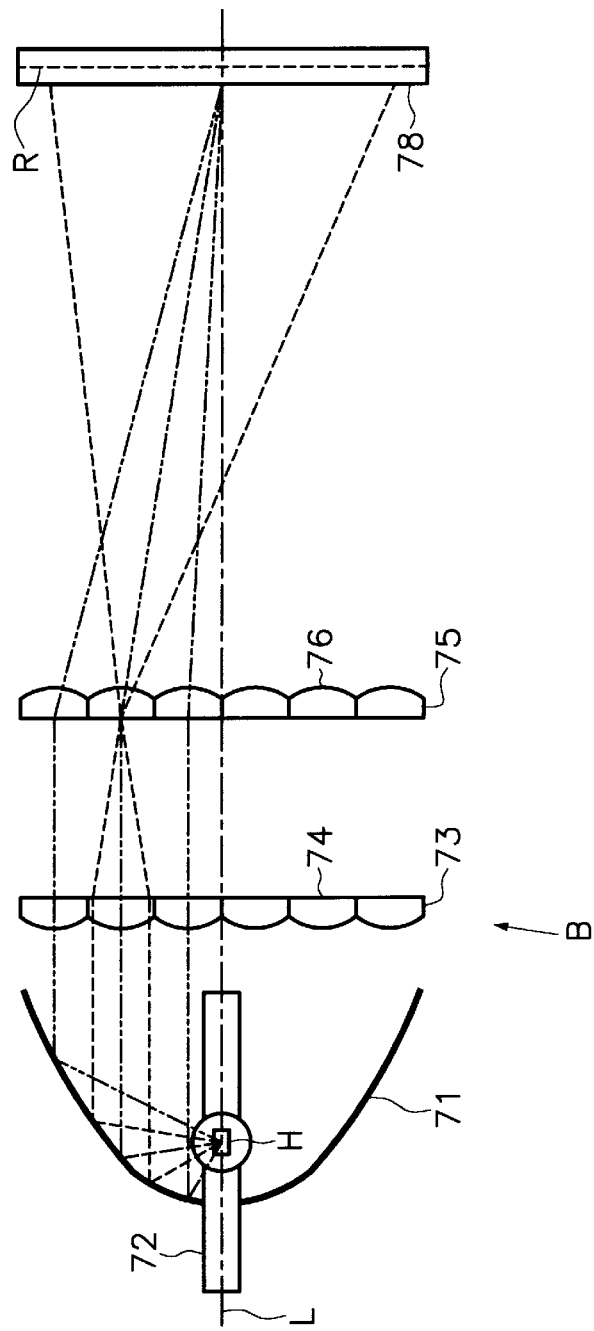
FIG. 6 (Prior Art)
FIG. 7 (Prior Art)

OPTICAL DEVICE AND MULTISURFACE REFLECTOR

BACKGROUND OF THE INVENTION

1. Field of the Invention

The invention relates to an optical device which is used for an image display device or the like, and a multisurface reflector which is used for this optical device.

2. Description of Related Art

Conventionally, a liquid crystal projector device of the projection type using a liquid crystal cell is known as an image display device for displaying large images. In this image display device, an optical device is necessary which illuminates the optical images formed by the liquid crystal cell with light with high intensity. The efficiency of this optical device greatly affects the image quality of the projection images in the image display device. Therefore, there is a need for an optical device with high efficiency and color reproducibility, which exhibits uniformity of the illumination intensity of the overall surface in the area to be illuminated and also advantageous color uniformity.

FIG. 6 schematically depicts a conventional example optical device arrangement. This known optical device is composed of a parabolic reflector 71 and a light source lamp 72 which is located along a center axis L of this parabolic reflector 71. A liquid crystal cell 78 is located on area R to be illuminated by the above described optical device.

In this optical device, light which is emitted from an emission part H of the light source lamp 72 is reflected by parabolic reflector 71. In this way, a light beam is formed which is essentially parallel to the center axis L of parabolic reflector 71 and which irradiates the liquid crystal cell 78 which is located on the illumination area R.

By this optical device, the light emitted from the light source lamp 72 is, for the most part, focussed by means of parabolic reflector 71, and is emitted as parallel light beam onto illumination area R. Therefore, a high utilization factor of the light can be obtained.

However, in the above described optical device, the light beam formed by means of the parabolic reflector 71 in the vicinity of its center has a high light flux density, while it has a low light flux density on its periphery. Therefore, the total surface of the area R to be illuminated cannot be illuminated with a uniform illumination intensity.

To improve the uniformity of the illumination intensity on the overall surface of the area R to be illuminated, a means is known by which the surface of the bulb of a light source lamp is subjected to frost treatment. On the surface of the bulb subjected to frost treatment, the light is diffused from the emission part. In doing so, therefore, it is considered disadvantageous that the intensity of the light which irradiates the area to be illuminated decreases considerably.

On the other hand, as another means for improving the uniformity of the illumination intensity on the overall surface of the area to be illuminated, a means using an integrator lens is known (see, U.S. Pat. No. 2,186,123).

FIG. 7 shows, in schematic form, a conventional example of the arrangement of an optical device B using an integrator lens. In this optical device, a first lens plate 73, on which several lens elements 74 are located, is arranged in front of parabolic reflector 71 on a plane perpendicular to center axis L of the above described parabolic reflector. Between this first lens plate 73 and illumination area R, a second lens plate 75 is arranged in front of the first lens plate 73 such that it is spaced parallel to and from the first lens plate 73. On second lens plate 75, there are numerous lens elements 76, each of which corresponds to a lens element 74 on the first lens plate 73. Specifically, second lens plate 75 is arranged such that respective lens element 76 is positioned in the respective focal point of corresponding lens element 74 of first lens plate 73.

In this optical device, the light beam which is parallel to center axis L and which was formed by means of the parabolic reflector 71 is divided by respective lens element 74 of first lens plate 73 according to above described respective lens element 74 and this divided light is converged by corresponding respective lens element 76 on second lens plate 75. In this case, a real image of the emission part H of light source lamp 72 is formed on the respective lens element 76 of the second lens plate 75. The respective light which was converged by lens element 76 with second lens plate 75 is superimposed by the lens element 76 in the state in which the real image of emission part H is enlarged, in the same area R to be illuminated.

In the light divided by first lens plate 73, the light flux density in the vicinity of the center has a small difference from the light flux density on the periphery due to the above described optical device. Furthermore, by means of second lens plate 75, the respective divided light is superimposed in the same area R to be illuminated. In this way, high uniformity of the illumination intensity can be obtained on the overall surface of above described illumination area R.

In the above described optical device the following disadvantages arise:

(1) Two lens plates are needed, i.e., the first lens plate 73 and the second lens plate 75. It is also necessary that the lens plates be arranged at a distance from one another. Therefore, the optical device has a larger dimension in the direction of the optical axis (center axis L of the parabolic reflector 71). In this way, the overall device becomes large.

(2) The size of the real image which is formed on respective lens element 76 of second lens plate 75 is determined by the size of emission part H and the distance between the parabolic reflector 71 and the respective lens element 76 of the second lens plate 75. This means that the larger the emission part H of light source lamp 72 and the greater the distance between parabolic reflector 71 and respective lens element 76 of second lens plate 75, the larger becomes the real image formed.

As light source, a metal halide lamp of the short arc type is generally used for lamp 72 because it has high radiant efficiency, high uniformity of the spectral energy distribution, and good color reproduction. The emission part of this metal halide lamp, for example, has a length from 3 to 4 mm, a width of 2 to 3 mm, a roughly cylindrical shape, and is relatively large. Furthermore, the distance between the parabolic reflector 71 and the respective lens element 76 of the second lens plate 75 is rather large, because first lens plate 73 must be placed between parabolic reflector 71 and second lens plate 75.

The real image of emission part H is formed on respective lens element 76 of second lens plate 75. However, light which corresponds to a part of the real image of above described emission part H which diverges from the aperture of lens element 76, i.e., light which is emitted by the peripheral area of emission part H, cannot be used, since conventionally the aperture of lens element 76 is smaller than the real image of emission part H. Therefore, a high utilization factor of the light cannot be obtained.

On the other hand, in the case in which the second lens plate consists of lens elements which have larger openings than the formed real image of emission part H, a high light utilization factor can be obtained. However, here, the dimensions of the entire second lens plate become large. The optical device, therefore, becomes large in the direction which intersects the optical axis. Furthermore, the light which emerges from the lens elements in the peripheral area of the second lens plate has a large irradiation angle with respect to area R to be illuminated. Therefore, a projection lens is needed with a small F number. However, it is difficult to form a low cost image display device with a small shape because a projection lens with a small F number has a large effective aperture and high costs.

(3) The equilibrium of the spectral energy for the light emitted from entire emission part H cannot be maintained since the light emitted from the peripheral area of emission part H of light source lamp 72 is not used by second lens plate 75, as was described above. Therefore, no light was obtained which has the expected spectral distribution. In particular, in the case in which an image display device which displays color images is used, an image with the expected hue cannot be projected. This is described specifically in the following:

FIG. 8 is a schematic of an arrangement of a liquid crystal projector device of the projection type for display of color images which has the optical device B with the configuration shown in FIG. 7. In this liquid crystal projector device, the light which emerges from each lens element 76 of the second lens plate 75 in the optical device 70 of the configuration shown in FIG. 7 is reflected by total reflex mirror 80a, then passes through a UV-IR-cut filter 81 which screens out ultraviolet radiation and infrared radiation reaches mirror 82. Mirror 82 is provided with a multilayer color separation film and the infrared radiation reaching this mirror 82 is separated into a red component, a green component and a blue component.

The light with the red component is emitted via total reflex mirror 80b and condenser lens 84a onto a liquid crystal cell for red 85 which is located on an illumination area R1. On the other hand, the light with the green component and the light with the blue component are separated by means of a mirror 83 having a multilayer color separation film, the light with the green component being emitted via condenser lens 84b onto a liquid crystal cell for green 86 which is located on area illumination area R2. The light with the blue component is emitted via condenser lens 84c onto a liquid crystal cell for blue 87 which is located on an illumination area R3.

The light which emerges from respective lens element 76 of second lens plate 75 is separated in this way into the red component, the green component, and the blue component and then superimposed at liquid crystal cell for red 85, at liquid crystal cell for green 86, and liquid crystal cell for blue 87, respectively.

The light with the red component and the light with the green component are combined by mirror 88 with a multilayer color synthesis film. Furthermore, this light is combined with the light with the blue component by mirror 89 which also has a multilayer color synthesis film. This combined light is emitted via projection lens 90 onto a suitable screen which is not shown in the drawing. In this way, a color image is projected on the above described screen.

The metal halide lamp used as light source lamp 20 has high uniformity of the spectral energy distribution for light which is emitted from the entire emission part. The spectral distribution of the emitted light is, however, different according to the area of the emission part. This means that, in the center area of the emission part, the light ratio is large due to the mercury line, while in the peripheral area of the emission part, the light ratio with wavelengths that are greater than or equal to 600 nm is large due to molecular emission.

Therefore, if the light which is emitted from the peripheral area of the emission part of the metal halide lamp is lost by second lens plate 75, the red component with wavelengths of greater than or equal to 600 nm decreases in a large ratio, as was described above. The equilibrium of the spectral energy for the second lens plate 75, therefore, cannot be maintained. As a result, an image with the expected hue cannot be projected onto the screen.

SUMMARY OF THE INVENTION

The invention was made on the basis of the aforementioned. Therefore, the first object of the invention is to devise an optical device which has high uniformity of the illumination intensity on the entire surface of an area to be illuminated, and a small shape, and in which a high utilization factor of the light can be obtained.

The second object of the invention is to devise an optical device in which light with high uniformity of the spectral distribution can be emitted.

The third object of the invention is to devise a multisurface reflector which is used for the above described optical device.

The above described objects are achieved according to the invention by embodiments of an optical device having a multisurface concave reflector which is composed of several mirror elements which each have an oval reflection surface, a light source lamp in which the emission part is arranged such that it is positioned along the center axis of the multisurface reflector, and a lens plate which is located in front of the multisurface reflector on a plane perpendicular to the center axis of thereof, and in which there are several lens elements, each of which correspond to the mirror elements in the multisurface reflector. Additionally, in each mirror element of the multisurface reflector, a focal point is positioned in the emission part of the light source lamp, and another focal point is positioned for the corresponding lens element in the lens plate, the light from the emission part of the light source lamp being divided by the respective mirror element for the multisurface reflector, and this divided respective light being superimposed by the respective mirror element in the lens plate in an area to be illuminated.

The objects according to the invention are furthermore advantageously achieved by the above described lens plate being located on the side of the opening of the multisurface reflector in the optical device.

The objects according to the invention are additionally advantageously achieved by the above described light source lamp being a metal halide lamp of the short arc type in the optical device.

The object with respect to the reflector is also achieved by the fact that, in a multisurface reflector which is formed such that several mirror elements are arranged in an overall concave form which each mirror element has an oval reflection surface, in the above described several mirror elements, some focal points are positioned substantially at the same general location in which there is a light source, and that the other focal points are located on an essentially identical plane which is perpendicular to the center axis of the concave multisurface reflector forward thereof, and at the same time, that they are arranged such that they are positioned in the same arrangement as the arrangement of the mirror elements.

In the following the invention is described specifically using several embodiments shown in the drawings. However, the invention is not limited thereto.

BRIEF DESCRIPTION OF THE DRAWINGS

FIG. 6 is a schematic representation of a conventional arrangement of an optical device;

FIG. 7 shows a schematic representation of another conventional example of the arrangement of an optical device.

DETAILED DESCRIPTION OF THE PREFERRED EMBODIMENTS

Figure 1:
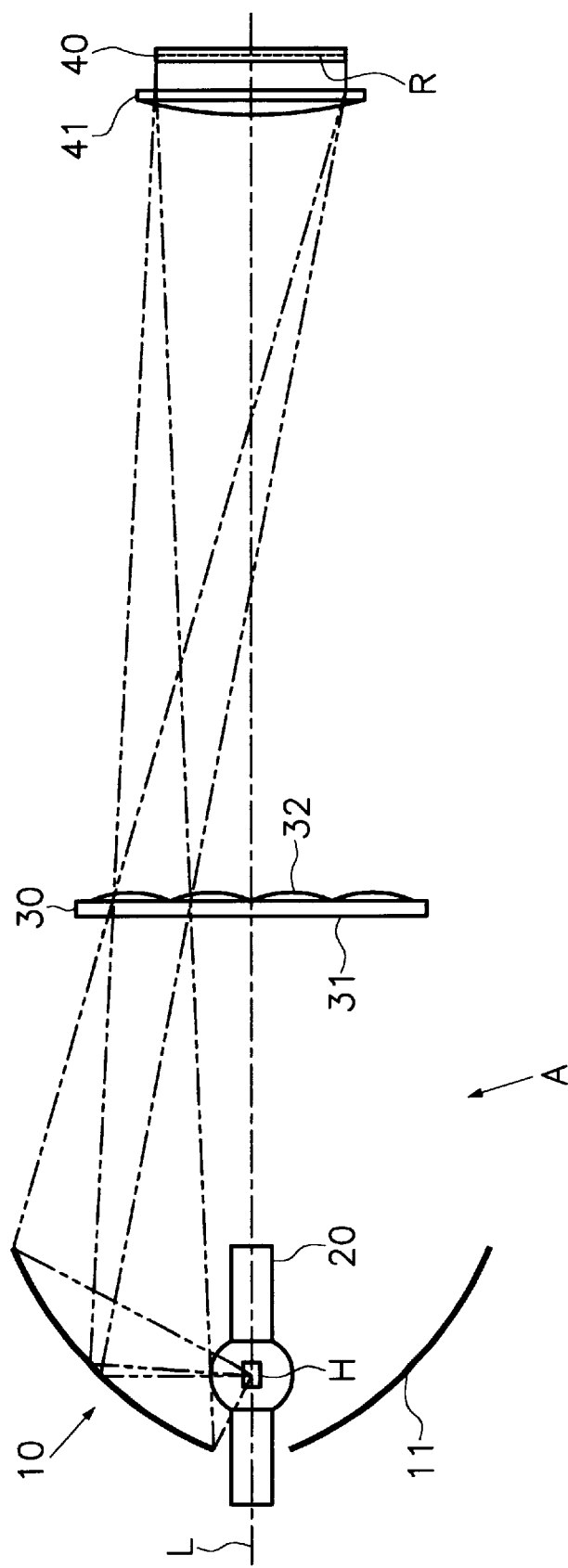
FIG. 1 shows a schematic of one example of an arrangement of the optical device according to the invention.

FIG. 1 is a schematic of one example of the arrangement of the optical device A according to the invention. This arrangement comprises a concave multisurface reflector 10 and a light source lamp 20 having a roughly cylindrical emission part H located on center axis L of multisurface reflector 10 such that it is positioned along center axis L. Furthermore, the arrangement also includes a lens plate 30 which is located in front of multisurface reflector 10 on a plane that is perpendicular to the center axis L of the multisurface reflector 10. Still further, a body to be illuminated 40 is located on an illumination area R of the optical device A and which, for example, has a cornered shape, e.g., rectangular, in front of which a condenser lens 41 is positioned.

Figure 2:
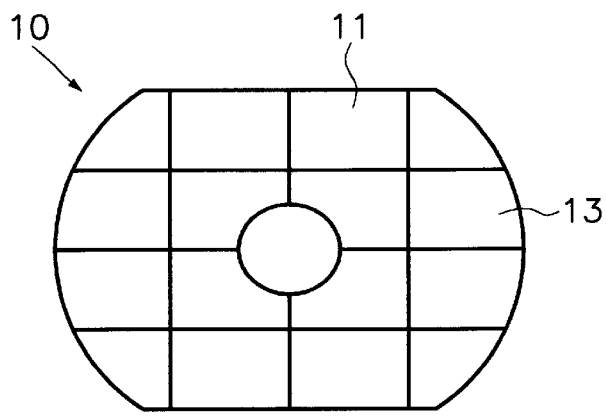
FIG. 2 schematically shows one example of a multisurface reflector.

As is shown in FIG. 2, multisurface reflector 10 is formed numerous mirror elements 11 (in the example shown in the drawing, 16) which combine to form a generally oval reflection surface having an overall concave shape as seen in FIG. 1. For each mirror element 11, a suitable shape as viewed from the front of the multisurface reflector 10 is a cornered shape which is similar to body 40 which is to be illuminated and which is located in illumination area R.

For the light source lamp 20, it is desirable to use a metal halide lamp of the short arc type. Dysprosium, indium, tin and the like are metal components which are encapsulated in the such a lamp, while iodine, bromine and the like are the halogen components.

Figure 3:
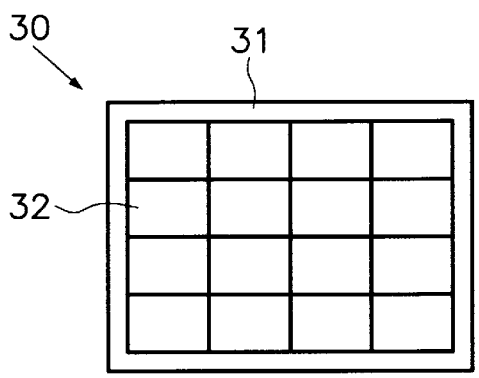
FIG. 3 is a schematic depiction of one example of a lens plate.

As is shown in FIG. 3, lens plate 30 comprises substrate 31 on which are disposed numerous lens elements 32 which correspond in number to the mirror elements 11 of the multisurface reflector 10. Lens elements 32 are each located on the surface of the side of substrate 31 which faces the illumination area R and are located immediately abutting one another.

Each of the mirror elements 11, as mentioned in the "Summary of the Invention" has an oval reflection surface, i.e., the projected curvature of each element 11 represents a respective oval (represented in dash lines in FIG. 4) having a major axis X.

Figure 4:
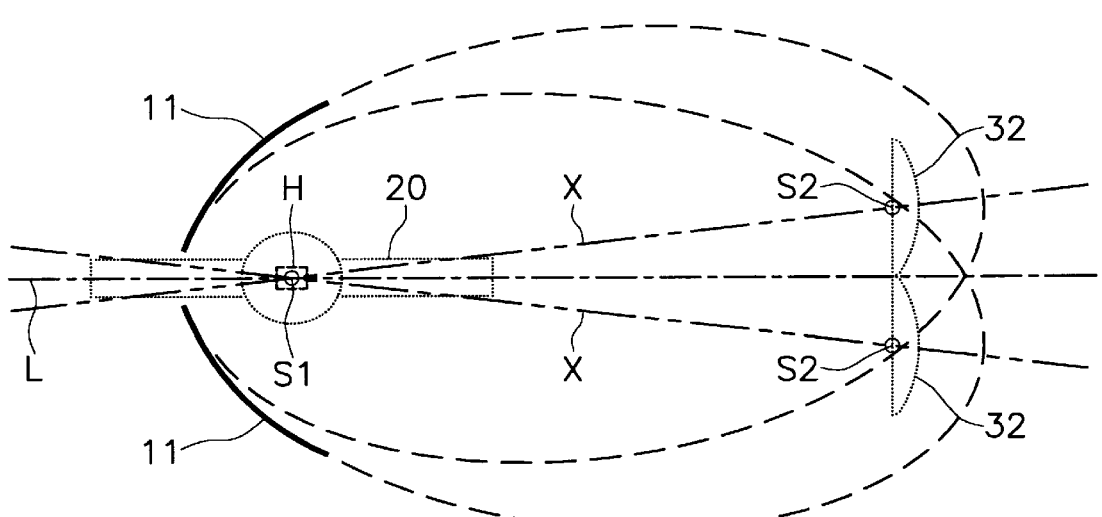
FIG. 4 shows a schematic of a state in which mirror elements are arranged in the multisurface reflector.

As is illustrated in FIG. 4, the major axes X of mirror elements 11 of the multisurface reflector 10 according to the invention each have a different slope with respect to the center axis L of the multisurface reflector 10. Some focal points S1 of each oval are positioned in essentially the identical place in which the light source is located. Other focal points S2 of each oval are located on an essentially identical plane which is perpendicular to the center axis L of the multisurface reflector 10, and at the same time, they are arranged such that they are positioned in the same arrangement as the arrangement of mirror elements 11. Specifically, each mirror element 11 has a focal point S1 positioned in the center of emission part H of light source lamp 20 and another focal point S2 which is positioned in an upper part of a corresponding lens element 32 of lens plate 30.

In the above described optical device, the light emitted from the emission part H of the light source lamp 20 is divided by multisurface reflector 10 according to its respective mirror elements 11. This divided light is converged by corresponding lens element 32 of lens plate 30. In doing, so a real image of emission part H of light source lamp 20 is formed on the respective lens element 32 of lens plate 30. The respective light which has been converged by lens element 32 is superimposed by above described lens element 32 in the state in which the real image of emission part H is enlarged, in illumination area R.

By above described multisurface reflector 10, the light emerging from the location of the light source can be divided by mirror element 11 according to the measure by which the first focal points S1 of the various mirror elements 11 are each positioned at essentially the same place where the light source is located. Furthermore, the respective divided light can be converged according to the arrangement of mirror elements 11 at a different location on an essentially identical plane by the measure by which the second focal points S2 of mirror elements 11 are located on an essentially identical plane which is oriented perpendicular to center axis L of multisurface reflector 10, and furthermore, by being positioned in the state in which they have the same arrangement as the arrangement of the mirror elements 11 and the lens elements 32.

Furthermore, high uniformity of the illumination intensity can be obtained by the optical device due to the measure by which the light from emission part H of the light source lamp 20 is divided by the multisurface reflector 10, and furthermore, by the respective divided light being superimposed by the lens plate 30 in illumination area R on the entire surface of the area to be illuminated.

In addition, the distance between multisurface reflector 10 and lens plate 30 can be reduced due to the fact that no additional lens plate is required between the multisurface reflector 10 and the lens plate 30. In this way, the dimension of the device in the direction of center axis L can be reduced. Furthermore, for each lens element 32 on lens plate 30, a real image of emission part H can be formed with a dimension which is less than the opening of the lens element 32. In this way, it is possible to prevent some of the light from multisurface reflector 10 from being lost, and as a result, a high utilization factor can be obtained.

Additionally, by using a metal halide lamp of the short arc type as light source lamp 20, light having a high uniformity of the spectral energy distribution is emitted by the entire emission part H of the light source lamp 20. Also, by preventing the loss of part of the light from emission part H in lens plate 30, the equilibrium of the spectral energy can be maintained and therefore light with high uniformity of the spectral distribution can be emitted.

Figure 5:
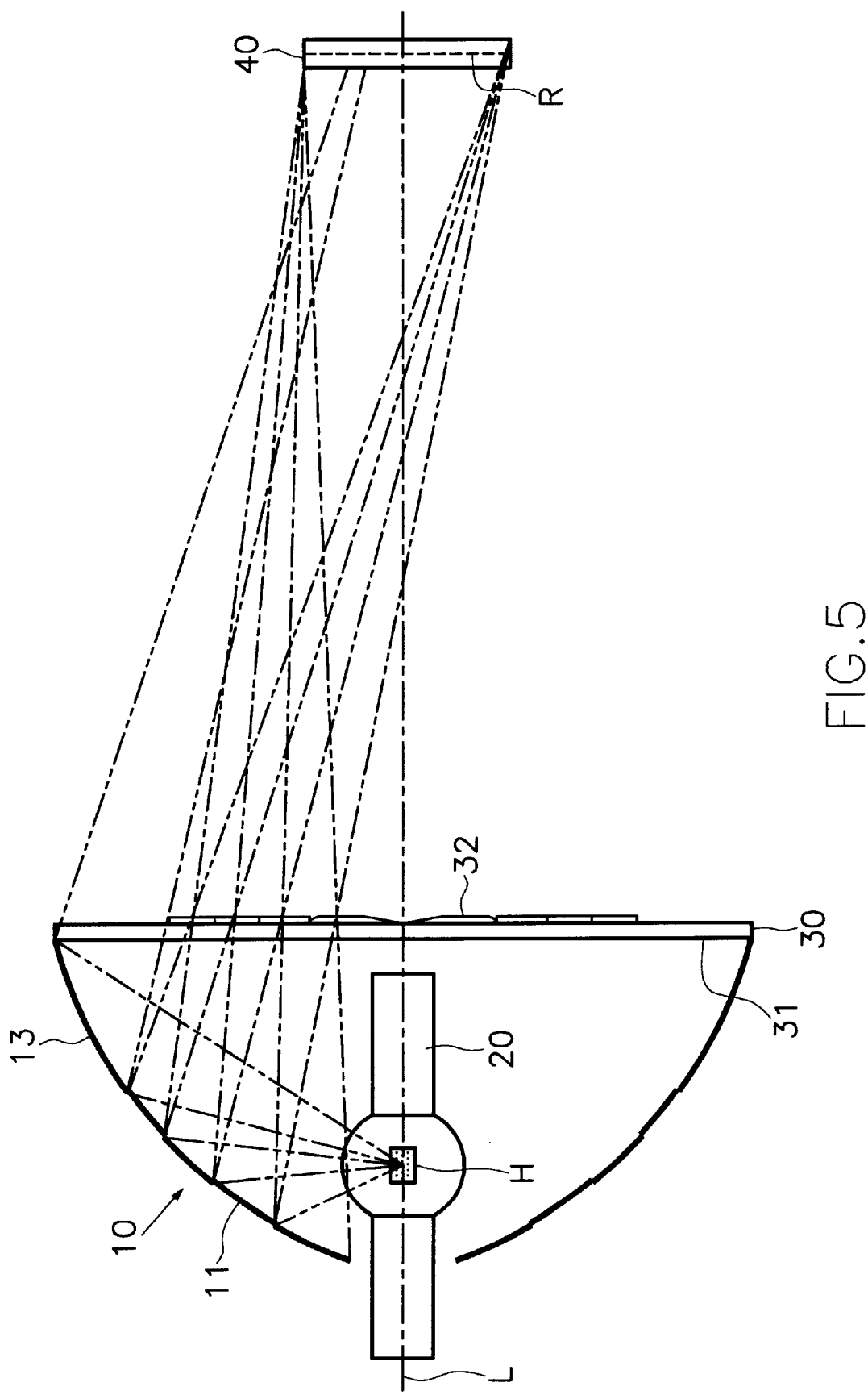
FIG. 5 schematically illustrates another example of an arrangement of the optical device according to the invention.
Figure 8:
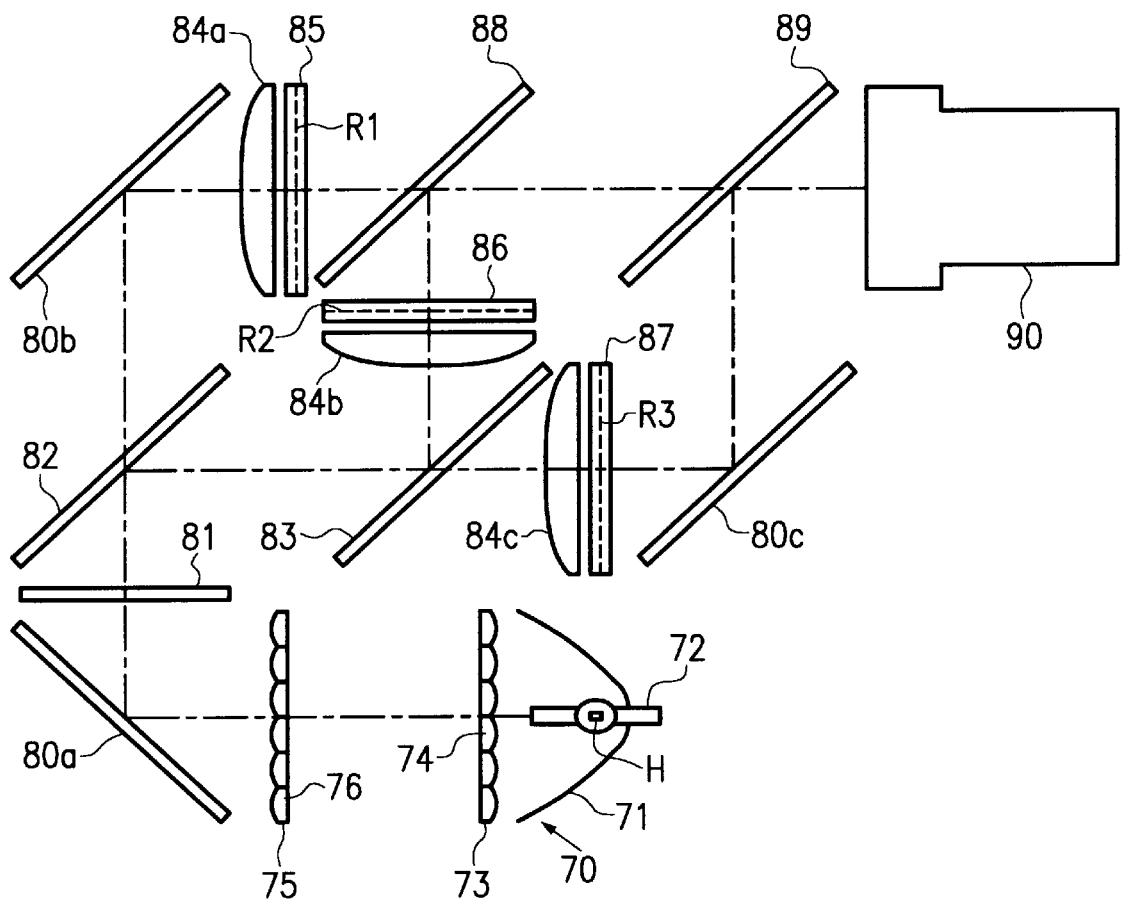
FIG. 8 schematically shows one example of the arrangement of an image display device using the optical device shown in FIG. 6.

In the optical device according to the invention, lens plate 30 can be located directly over the opening of the multisurface reflector 10, as is shown in FIG. 5. By means of this arrangement, the distance between the multisurface reflector 10 and the lens plate 30 becomes extremely small. Furthermore, the size of the entire optical device can be reduced.

In an optical device with this configuration, in the case in which focussing on lens plate 30 by the mirror elements 13 at the open end sides of the multisurface reflector 10 is difficult with respect to the reflection angle, the mirror elements 13 can be arranged such that light reflected by them directly irradiates the body 40 to be illuminated (as can be seen for the uppermost ray passing from reflector 10 to body 40 in FIG. 5). In this case, there is no problem in practice since the uniformity of the illumination intensity can be ensured by means of mirror elements 11.

Under the following conditions optical device A with the configuration shown in FIG. 1 can be produced:

multisurface reflector 10
number of mirror elements 11: 16
diameter of opening: 84 mm
light source lamp 20
metal halide lamp
encapsulated material: Dy, In, Sn
power consumption: 250 W
lens plate 30
dimensions of substrate 31: 70 mm×70 mm×6 mm
number of lens elements 32: 16
dimensions of opening of lens element 32: 14.5×1.0 mm
distance between opening of multisurface reflector 10 and lens plate 30: 75 mm
distance between lens plate 30 and illumination area R: 170 mm
dimensions of area R to be illuminated: 26.4 mm×19.8 mm When the above described optical device was actuated, the illumination intensity in illumination area R was roughly 1,700,000 lux. The uniformity of the illumination intensity on the entire surface of above described illumination area R. Furthermore, it was described that the light which irradiates illumination area R has the same spectral distribution as the light emitted directly from light source 20.

Using the above described light source lamp 20, the light source device B shown in FIG. 7 was produced and actuated for comparison purposes. In doing so, the uniformity of the illumination intensity on the entire surface of illumination area R was high, with the illumination intensity in the illumination area R being roughly 1,300,000 lux. However, the light utilization factor for device B as compared to light source device A was lower. Furthermore, for the light which irradiates illumination area R, the ratio of the red component with wavelengths of greater than or equal to 600 nm compared to the light emitted directly by light source lamp 20 was smaller for device B.

ACTION OF THE INVENTION

By means of the optical device according to the invention high uniformity of the illumination intensity on the entire surface of the area to be illuminated can be obtained, the size of the entire device can be reduced, and at the same time a high light utilization factor can be obtained.

Furthermore, the entire device can be made even smaller by the arrangement of the lens plate on the side of the opening of the multisurface reflector.

In addition, by using a metal halide lamp of the short arc type as the light source lamp, light with a high uniformity of the spectral distribution can be emitted.

It is to be understood that although preferred embodiments of the invention have been described, various other embodiments and variations may occur to those skilled in the art. Any such other embodiments and variations which fall within the scope and spirit of the present invention are intended to be covered by the following claims.

What we claim is:

1. An optical device, comprising:
   a concave multisurface reflector composed of numerous mirror elements arranged to form a reflection surface having a generally oval shape;
   a light source lamp having an emission part arranged along a center axis of the multisurface reflector; and
   a lens plate which is located in front of the multisurface reflector on a plane which is perpendicular to the center axis of the multisurface reflector, said lens plate having a plurality of lens elements equal in number to the mirror elements of multisurfacc reflector;
   wherein as part of a means for producing high uniformity of illumination intensity across an area to be illuminated, each mirror element of said multisurface reflector has an oval shape with a first focal point of the oval shape being positioned in the emission part of the light source lamp, and a second focal point of the oval shape being positioned at a respective corresponding lens element of the lens plate, as a means for dividing light from the emission part of the light source lamp by each mirror element of said multisurface reflector, and for superimposing the divided light, via the corresponding lens element of the lens plate, in an area to be illuminated.

2. Optical device according to claim 1, wherein the lens plate is located on an open end of the multisurface reflector.

3. Optical device according to claim 1, wherein the light source lamp is a metal halide lamp of the short arc type.

4. Optical device according to claim 1, further comprising a plurality of side edge mirror elements located at open end sides of the reflection surface; wherein said side edge mirror elements are arranged such that light reflected by said side edge mirror elements directly irradiates the area to be illuminated.

5. Optical device according to claim 1, wherein said multisurface reflector is the sole reflector, an area between said light source lamp and said lens plate being free of auxiliary reflectors.

6. A multisurface reflector comprising:
   numerous mirror elements arranged to form a concave reflection surface having an overall shape which is generally oval; wherein as part of a means for producing high uniformity of illumination intensity across an area to be illuminated, said mirror elements have an oval shape with the first focal points of the oval shape of the mirror elements being positioned at essentially the same location on a center axis of the concave reflection surface, where a light source is to be positioned, and wherein the oval shapes ofthe mirror elements have respective second focal points located on an essentially identical plane which is perpendicular to the center axis of the concave reflection surface at a location forward of said first focal point, and wherein said second focal points are positioned in said plane in the same arrangement with respect to each other as the corresponding arrangement of the respective mirror elements.

7. A multisurface reflector according to claim 6, further comprising a plurality of side edge mirror elements located at open end sides of the reflection surface; wherein said side edge mirror elements are arranged such that light reflected by said side edge mirror elements directly irradiates an area to be illuminated which is located forward of the plane containing said second focal points.

\* \* \* \* \*